US012712854B2

(12) United States Patent
Jiang et al.

(10) Patent No.: US 12,712,854 B2
(45) Date of Patent: Aug. 18, 2026

(54) SECURE AND SCALABLE TUNNELING INFRASTRUCTURE FOR DELIVERING HIGH-INTERACTION OS-BASED DECEPTION AS A SERVICE TO LARGE-SCALE IT/OT/IOT MIXED NETWORKS

(71) Applicant: Fortinet, Inc., Sunnyvale, CA (US)

(72) Inventors: Jun Jiang, Vancouver (CA); Hongquan Mi, Surry (CA); Moshe Ben Simon, Atlit (IL)

(73) Assignee: Fortiney, Inc., Sunnyvale, CA (US)

( * ) Notice: Subject to any disclaimer, the term of this patent is extended or adjusted under 35 U.S.C. 154(b) by 150 days.

(21) Appl. No.: 18/892,538

(22) Filed: Sep. 23, 2024

(65) Prior Publication Data

US 2026/0122041 A1 Apr. 30, 2026

Related U.S. Application Data

(63) Continuation-in-part of application No. 18/823,902, filed on Sep. 4, 2024.

(51) Int. Cl.
*H04L 9/40* (2022.01)

(52) U.S. Cl.
CPC ........ *H04L 63/029* (2013.01); *H04L 63/0428* (2013.01); *H04L 63/1491* (2013.01)

(58) Field of Classification Search
CPC ......................... H04L 63/029; H04L 63/0428; H04L 63/1491
See application file for complete search history.

(56) References Cited

U.S. PATENT DOCUMENTS

| | | | | |
|---|---|---|---|---|
| 10,326,796 | B1 ‡ | 6/2019 | Varadarajan | H04L 63/1425 |
| 11,934,948 | B1 * | 3/2024 | Ferguson-Walter | G06N 3/045 |
| 12,107,889 | B2 * | 10/2024 | Kothari | H04L 63/1416 |
| 2012/0124372 | A1 ‡ | 5/2012 | Dilley | H04L 67/564 713/162 |
| 2014/0172552 | A1 ‡ | 6/2014 | Raab | G06Q 30/0248 705/14.47 |
| 2017/0134423 | A1 * | 5/2017 | Sysman | G06F 21/554 |
| 2022/0329627 | A1 * | 10/2022 | Wu | H04L 63/1491 |

(Continued)

OTHER PUBLICATIONS

Marc Ph. Stoecklin et al., Dressed up: Baiting Attackers through Endpoint Service Projection, ACM (Year: 2018).*

(Continued)

*Primary Examiner* — Shanto Abedin
(74) *Attorney, Agent, or Firm* — Law Office of Dorian Cartwright; Dorian Cartwright

(57) ABSTRACT

Secure data tunnels are established with a plurality of edge points on a plurality of local enterprise networks. At some point, request packets are received in real-time over the first secure tunnel from a first edge point that has encapsulated the request packets. The request packets originate from a malicious actor attacking a projected decoy. Response packets generated from high-fidelity processing of the request packets are encapsulated by the first decoy device and routing to the first secure data tunnel. The response packets are decapsulated and forwarded by edge points back to the malicious actor.

11 Claims, 8 Drawing Sheets

(56) References Cited

U.S. PATENT DOCUMENTS

| | | | | |
|---|---|---|---|---|
| 2023/0164183 | A1* | 5/2023 | Kothari | H04L 63/1416 726/23 |
| 2024/0056481 | A1‡ | 2/2024 | Ignatius | H04L 63/1491 |
| 2025/0088536 | A1* | 3/2025 | Couillard | H04L 63/1425 |

OTHER PUBLICATIONS

Albert Brzeczko et al., Active Deception Model for securing Cloud Infrastructure, IEEE (Year: 2014).*

Amirreza Niakanlahiji et al., Honey Bug: Personalized Cyber Deception for Web Applications, Proceedings of the 53rd Hawaii International Conference on System Sciences (Year: 2020).‡

* cited by examiner
‡ imported from a related application

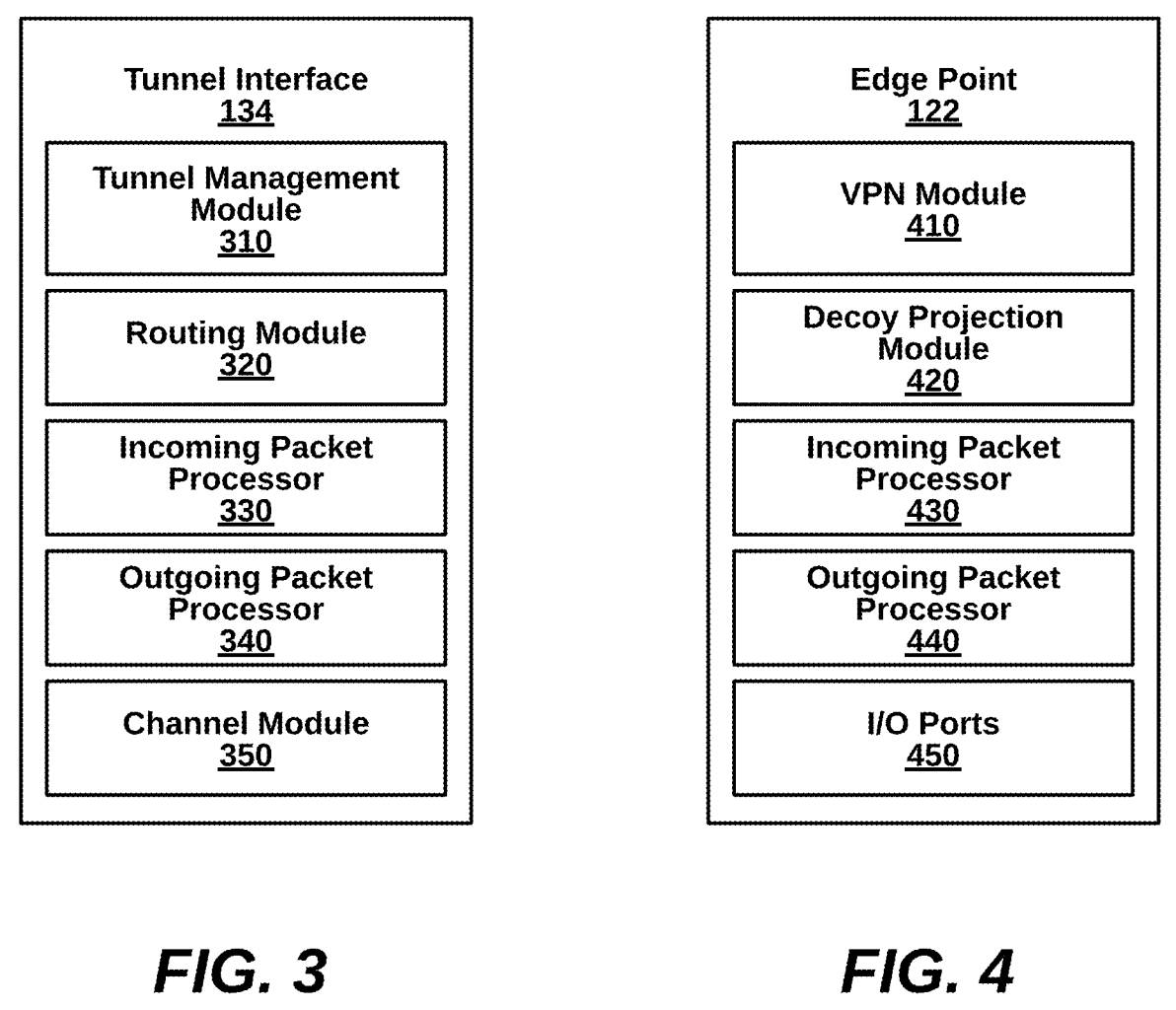

Tunnel Interface 134
Tunnel Management Module 310
Routing Module 320
Incoming Packet Processor 330
Outgoing Packet Processor 340
Channel Module 350

FIG. 3

Edge Point 122
VPN Module 410
Decoy Projection Module 420
Incoming Packet Processor 430
Outgoing Packet Processor 440
I/O Ports 450

FIG. 4

SECURE AND SCALABLE TUNNELING INFRASTRUCTURE FOR DELIVERING HIGH-INTERACTION OS-BASED DECEPTION AS A SERVICE TO LARGE-SCALE IT/OT/IOT MIXED NETWORKS

CROSS-REFERENCE TO RELATED APPLICATIONS

This patent application claims priority as a continuation-in-part under 35 U.S. C. 120 to commonly-owned U.S. application Ser. No. 18/823,902, the contents of which is hereby incorporated in its entirety.

FIELD OF THE INVENTION

The invention relates generally to computer networks, and more specifically, to projecting cloud-managed decoys over secure data tunnels to local enterprise networks to interact locally with malicious actors.

BACKGROUND

In the rapidly evolving landscape of cybersecurity, traditional defense mechanisms often struggle to keep pace with sophisticated threats. Attackers continually exploit vulnerabilities in networks, leading to data breaches, financial losses, and reputational damage for organizations.

The concept of deception-based cybersecurity is not entirely new; however, traditional approaches have been limited in scalability, flexibility, and effectiveness. Early systems relied on deploying honeypots or decoy assets within networks to lure attackers away from valuable assets. While effective to some extent, these solutions often require significant manual effort for deployment, monitoring, and maintenance.

The advent of cloud computing and virtualization technologies paved the way for a more dynamic and scalable approach to cloud-based deception technology. Leveraging these advancements, the concept 'deception-as-a-service (DaaS)', which is a comprehensive cloud based deception platform capable of delivering decoy as a service to diverse network environments has been proposed for a while in the recent years. Unlike traditional local deployed based deception solution that required big investments in equipment and expertise, Daas is a ready-to-use solution managed by experts. It's all run from the cloud, making it easy to scale and adapt to different networks.

Despite its numerous advantages over traditional locally deployed deception solutions, Deception-as-a-Service (DaaS) faces significant challenges in its cloud-based implementation. One of the most prominent challenges lies in ensuring the secure and efficient tunneling infrastructure required for transmitting decoy session traffic between edge points and the centralized service center. The complexity of establishing and maintaining encrypted tunnels across diverse network environments poses a formidable obstacle, particularly in ensuring the integrity and confidentiality of data transmission. Furthermore, the scalability and performance optimization of tunneling mechanisms to accommodate large-scale deployments add another layer of complexity.

Therefore, what is needed is a robust technique for projecting cloud-managed decoys over secure data tunnels to local enterprise networks to interact locally with malicious actors.

SUMMARY

To meet the above-described needs, methods, computer program products, and systems for projecting cloud-managed decoys over secure data tunnels to local enterprise networks to interact locally with malicious actors.

In one embodiment, a plurality of secure data tunnels are established with a plurality of edge points on a plurality of local enterprise networks. A first decoy device is sent over a first secure data tunnel to a first edge point for projection from the DaaS onto a first local enterprise network.

At some point, request packets are received in real-time over the first secure tunnel from a first edge point that has encapsulated the request packets. The encapsulated request packets can have a source address of the malicious attacker and a destination address of the first projected decoy. They have been encapsulated by the first edge point to have a source address of a first edge point.

In another embodiment, the request packets are decapsulated to expose the destination address of the first projected decoy. The request packets can be routed for decoy processing. Specific decoys and settings are based on the destination address of the first projected decoy and the source address of the first edge point.

In still another embodiment, response packets generated from high-fidelity processing of the request packets are encapsulated by the first decoy device and routing to the first secure data tunnel. The response packets have a destination address of the malicious attacker and a source address of the first projected decoy and have been encapsulated to have a destination address of the first edge point.

The response packets are then transmitted over the first secure tunnel to the first edge point. Once received, the packet processing decapsulates, reads, and reformats response packets before forwarding to the malicious actor. The forwarding is based on the destination address.

Advantageously, network performance and network devices are improved with better network security.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 3 is a more detailed block diagram illustrating a tunnel interface, according to an embodiment.

FIG. 4 is a more detailed block diagram illustrating an edge point, according to an embodiment.

DETAILED DESCRIPTION

Methods, computer program products, and systems for projecting cloud-managed decoys over secure data tunnels to local enterprise networks to interact locally with malicious actors. The following disclosure is limited only for the purpose of conciseness, as one of ordinary skill in the art will recognize additional embodiments given the ones described herein.

I. Tunneling Systems for Projecting Cloud-Managed Decoys (FIGS. 1-6)

Figure 1:
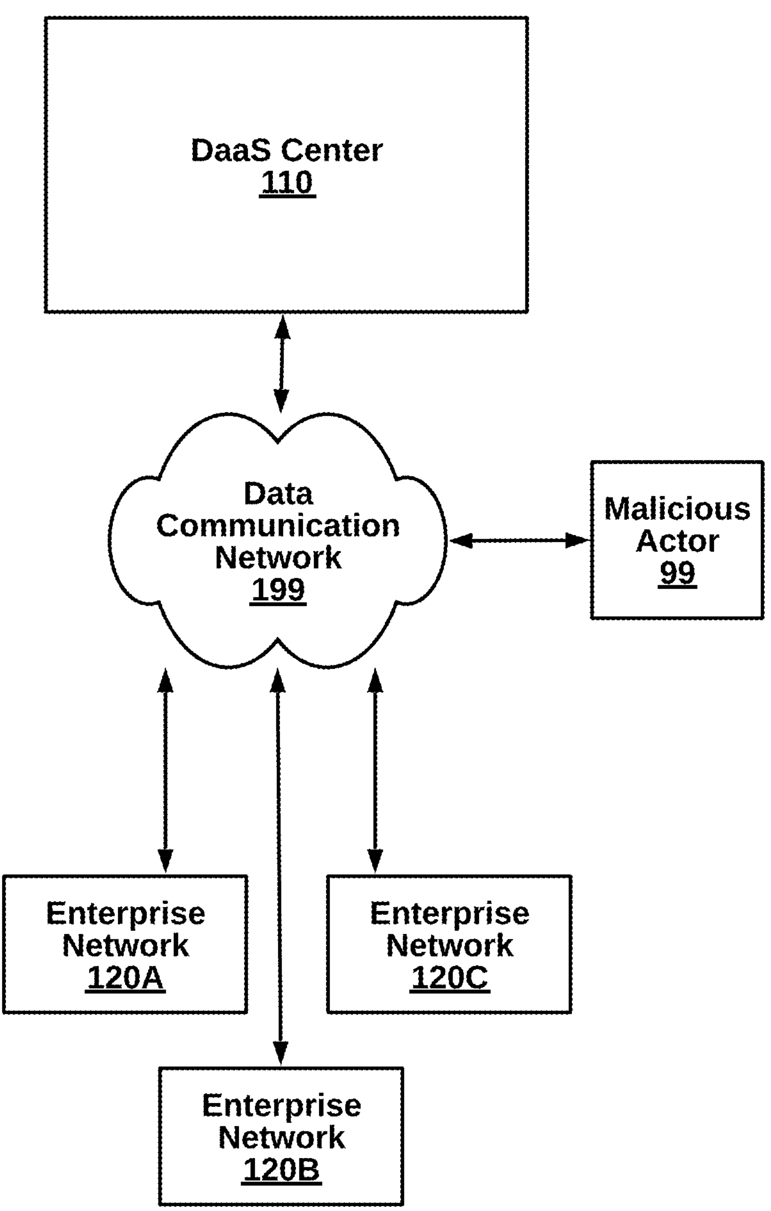
FIG. 1 is a high-level block diagram illustrating aspects of a system for projecting cloud-managed decoys over secure data tunnels to local enterprise networks to interact locally with malicious actors, according to some embodiments.
Figure 9:
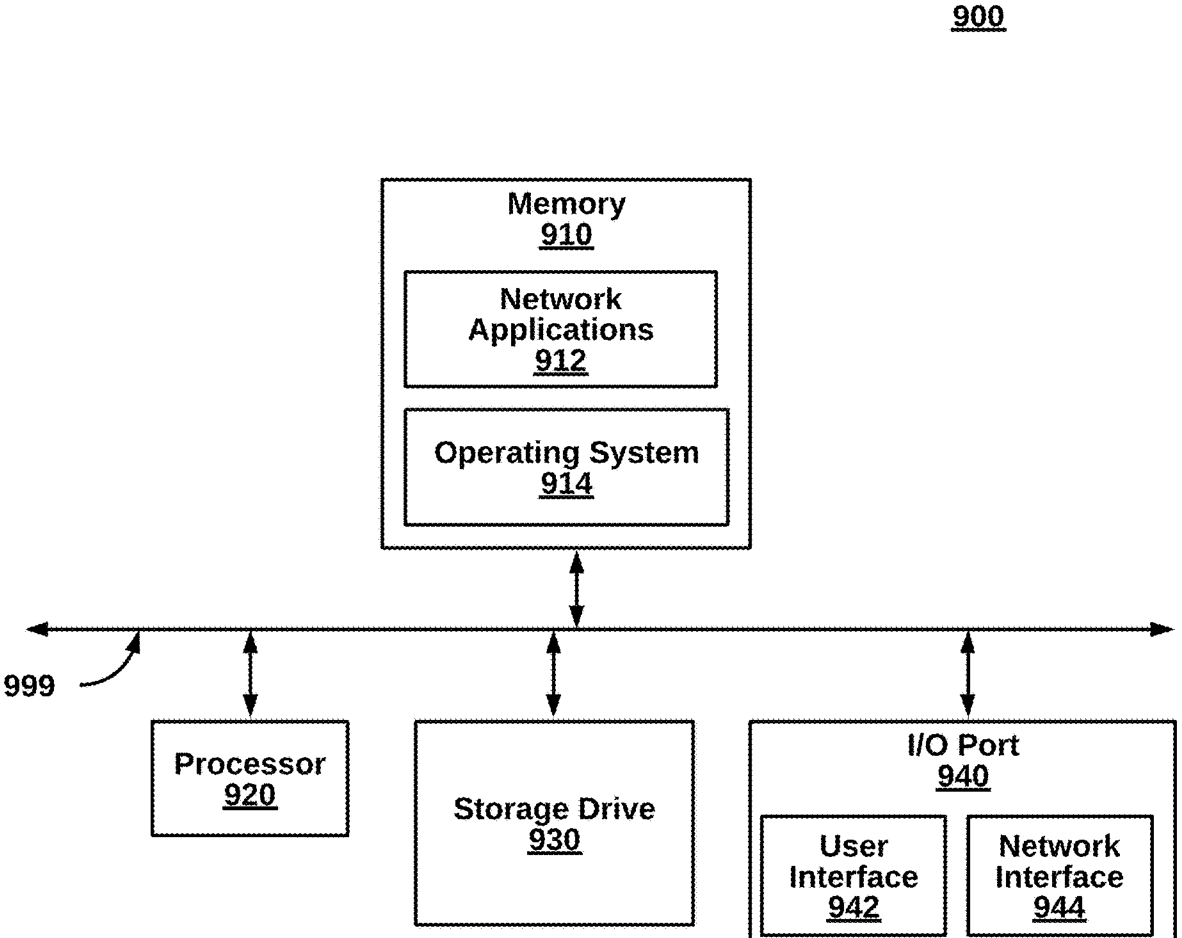
FIG. 9 is a block diagram illustrating an example computing device for the system of FIG. 1, according to an embodiment.

FIG. 1 is a high-level block diagram illustrating a system 100 for projecting cloud-managed decoys over secure data tunnels to local enterprise networks to interact locally with malicious actors, according to an embodiment. The system 100 includes a DaaS center 110 connected to a plurality of local enterprise networks 120A-C over a data communication network 199. A malicious actor 99 is engaging one or more assets of the plurality of local enterprise networks 120A-C. Other embodiments of the system 100 can include additional components that are not shown in FIG. 1, such as routers, switches, access points, and IT/OT/IOT devices. Further, there can be more edge point, local enterprise networks, additional malicious actors and a different distribution configurations for the DaaS center 110. The components of system 100 can be implemented in hardware, software, or a combination of both. An example implementation is shown in FIG. 9. The system 100 can also include other OT devices and also Internet of Things (IoT) devices, with rugged firewalls, such as industrial equipment, alarm systems, smart shoes, smart televisions, and the like.

In one embodiment, components of the system 100 are coupled in communication over a private network connected to a public network, such as the Internet. In another embodiment, system 100 is an isolated, private network, or alternatively, a set of geographically dispersed LANs. The components can be connected to the data communication system via hard wire (e.g., DaaS center 110 and local enterprise networks 120A-C). The components can also be connected via wireless networking (e.g., malicious actor 99). The data communication network can be composed of any combination of hybrid networks, such as an SD-WAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, 802.11be, Wi-Fi 6, Wi-Fi 6E, Wi-Fi 7 and the like. Components can use IPv4 or Ipv6 address spaces.

Figure 2:
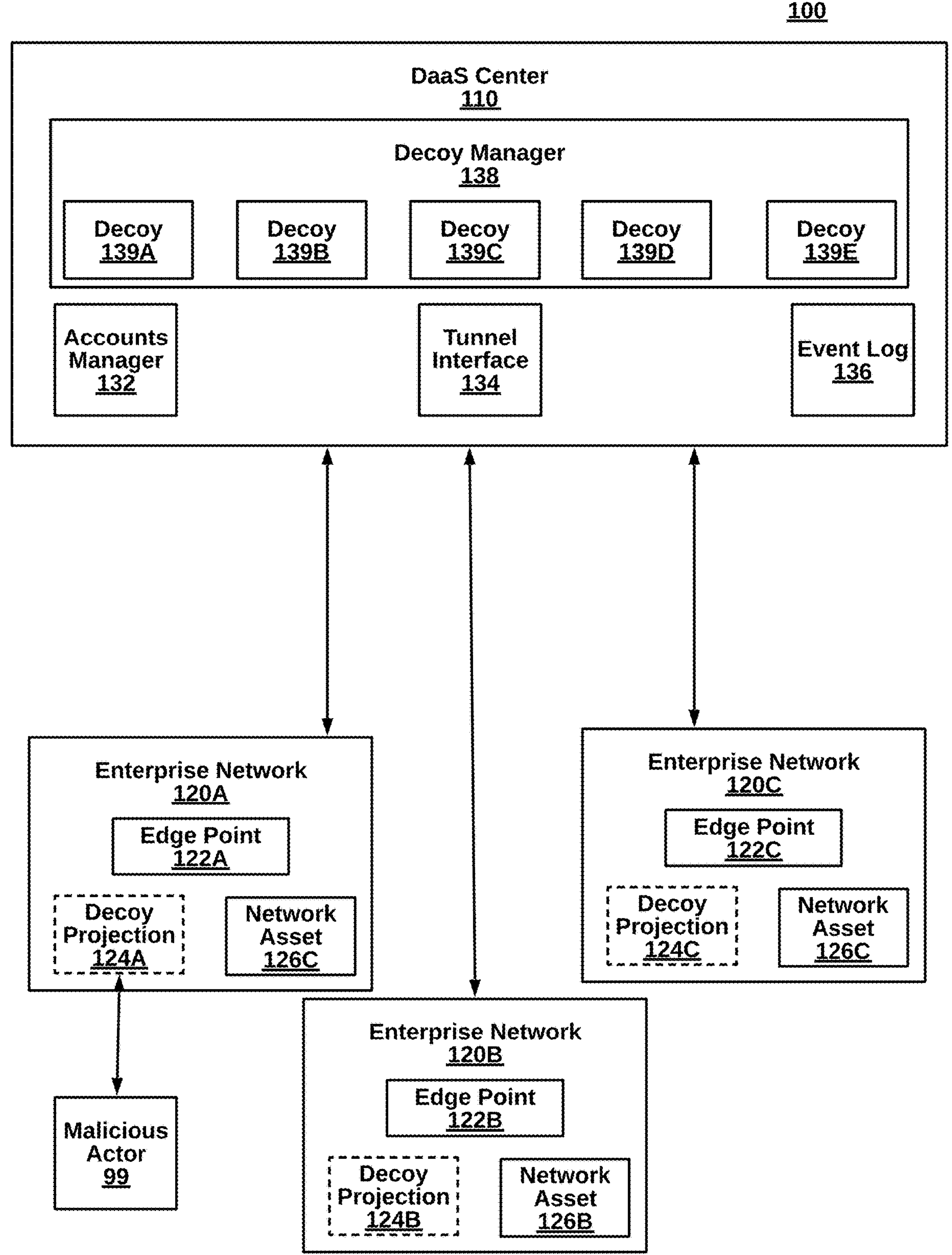
FIG. 2 is a more detailed block diagram illustrating a DaaS center of the system of FIG. 1, according to an embodiment.

FIG. 2 is a more detailed view of the components of FIG. 1, according to an embodiment. The DaaS center 110 further comprises an accounts manager 132 to configure a virtual decoy array based in the cloud. A tunnel interface 134 manages secure tunnels and routes request packets to specific decoys. An event log 136 stores and analyses attack events. A decoy manager 138 further includes a pool of decoys 139A-E. An individual decoy can correspond one-on-one with a projected decoy. The individual can also be a template that is projected over multiple different locations in a single network or over several unassociated networks.

The enterprise networks 120A-C each further comprise edge points 122A-C, decoy projections 124A-C and network assets 126A-C that are being protected. Preferably there are multiple decoys for each actual asset. As a result, malicious actor 99 is more likely to encounter a decoy rather than an actual asset that can be damaged. The tunnel interface 134, in some embodiments, manage hundreds or more different edge points for or more client enterprise networks.

Figure 5:
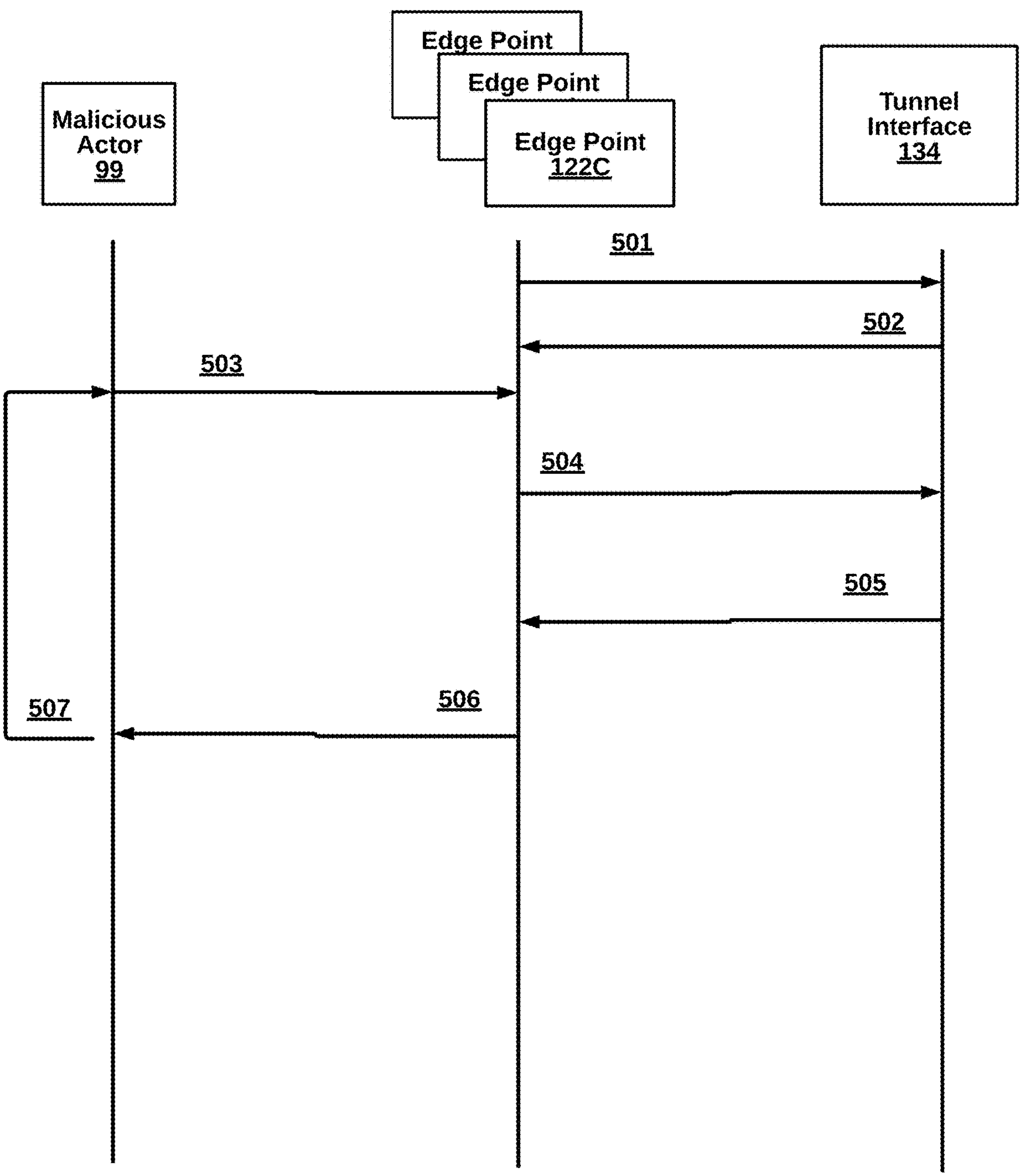
FIG. 5 is a sequence diagram illustrating interactions between the components of the system of FIG. 2, according to an embodiment.

FIG. 5 is a sequence diagram illustrating interactions between the components of the system of FIG. 2, according to an embodiment. At interaction 501, a network administrator configures a virtual set of decoy. In response, at interaction 502, parameters for decoy projections are sent to edge point 122A-C for local set ups. Once a malicious actor sends request packets to a decoy, at interaction 103, edge points 122A-C offloads decoy processing, at interaction 504. Response packets are returned from the decoy processing to edge points 122A-C, at interaction 505. Finally, at interaction 506, response packets are transmitted to malicious actor 99. The process can reset, at interaction 507, each time malicious actor 99 (or another malicious actor) engages decoys.

In one embodiment, edge points 122A-C manage packet exchanges between a backend of the DaaS center 110 and the local enterprise networks 120A-C. The edge points 122A-C can be a device, software or a system of devices. During registration, a network administrator can set up one or more edge points with the accounts manager 132, by IP address. This allows the edge points to authenticate with the DaaS center 110 to establish a VPN tunnel or some other type of secure communication for forwarding request packets from the malicious actor 99. The deceptive elements are pre-configured and centrally managed in the cloud by the DaaS system, thus the deception services provided by the DaaS system may be easily scaled up and down, and quickly set up without a complex deployment process by users. After processing by decoys at the DaaS center 110, response packets are returned over the tunnel for forwarding to the malicious actor 99.

The proxy is transparent to the malicious actor 99 which makes security actions more effective. The 'as-a-service' models, such as Software as a Service (Saas), Infrastructure as a Service (IaaS) and Platform as a Service (PaaS), have been growing rapidly and are relatively mature in the technology market. The technology of the DaaS system described herein provides at least several advantages and technical improvements over existing computing systems. The Daas disclosed in this application provides high-fidelity, high-interaction operating system (OS)-based decoys that closely mimic real systems, enhancing the realism and effectiveness of the deception. The DaaS supports mass virtualization by taking advantage of the template-based decoys and enables the deployment of large-scale decoy projections to user defined networks. A DaaS system means that all the real decoys are deployed and managed centrally on the cloud servers and then projected to the user local networks. The users save costs and efforts for system maintenance, complex decoy system setup, and deployment processes. The DaaS system automates the customization and deployment of decoys, and with active and passive asset discovery, reduces the need for manual intervention and simplifies the setup process while ensuring that decoys are deployed in the most effective locations. The DaaS system supports remote and automatic quarantine processes, manual blocking, and unblocking of malicious devices or actions, thereby enhancing the responsiveness to threats. The DaaS system provides both public decoys (shared across user groups) and private custom decoys (exclusive to a user's network), offering flexibility in deployment strategies while achieving maximum cost-effectiveness. The provided services are running in the cloud (e.g., on a cloud server provided by a CSP) and delivered over the Internet, instead of being installed and hosted in the premise network. As a result, resource intensive decoy processing is offloaded from local enterprise networks, with limited resources, to the cloud.

Decoy manager 138 manages and configures decoys 139A-E (including configuring lure information). Decoy manager 138 provides the capability for the user to configure what type of decoy the user would like to project to (e.g., including but not limited to a Windows decoy, a Linux decoy, a variety of OT device decoys, a variety of IoT device decoys, a variety of medical decoy, etc.), and what services of the selected decoy the user would like to choose (e.g., including but not limited to secure shell (SSH), hyper-text transport protocol (HTTP), samba, file transfer protocol (FTP), remote desktop protocol (RDP), simple mail transfer protocol (SMTP), etc.), network setting the user would like project the decoy to the on-premise network, including configuring the IP address, mac address, and port number for the selected services, and as well as the lure information (including the user name and password for the selected services, if available). All customization and configuration selections for the user selected decoy and services may be applied to the projected decoy.

In an embodiment, a decoy template may define a type of decoy that may include, but is not limited to, a Linux decoy, a Windows decoy, an IoT decoy, an OT device decoy, a medical decoy, etc. Under each template category, there may be different decoy instances for each type of decoy, capable of providing different services or configurations. Additionally, different instances may be identical in terms of the configuration and template and other attributes, which are dynamically developed in the deception pool for workload sharing.

Event log 136 may store attack and response information for analysis and reporting. Attack session tracer 116 traces and monitors all the attack session's activities occurring on all decoys 139A-E in deception pool and sends this information to event log 136. For example, when an attacker initializes an attack on a decoy, the attacker's identification information, such as IP address, mac address, port number, user name, login password, injected command (if applicable), accessed files, and/or injected content in the specified files, etc., will saved into the event log and subsequently displayed to the user. Event log 136 may include attack requests, response, incident reports, and related events.

FIG. 3 is a more detailed block diagram illustrating the tunnel interface 134, according to an embodiment. The tunnel interface includes a tunnel management module 310, an incoming packet processor 320, an outgoing packet processor 330, a routing module 340, and a decoy network 350.

The tunnel management module 310 establishes a plurality of secure data tunnels with a plurality of edge points on a plurality of local enterprise networks. A first decoy device is sent over a first secure data tunnel to a first edge point for projection from the DaaS onto a first local enterprise network. In one embodiment, secure tunnels are managed for multiple different clients. More than one secure tunnel can be set up for a single client.

Figure 6A:
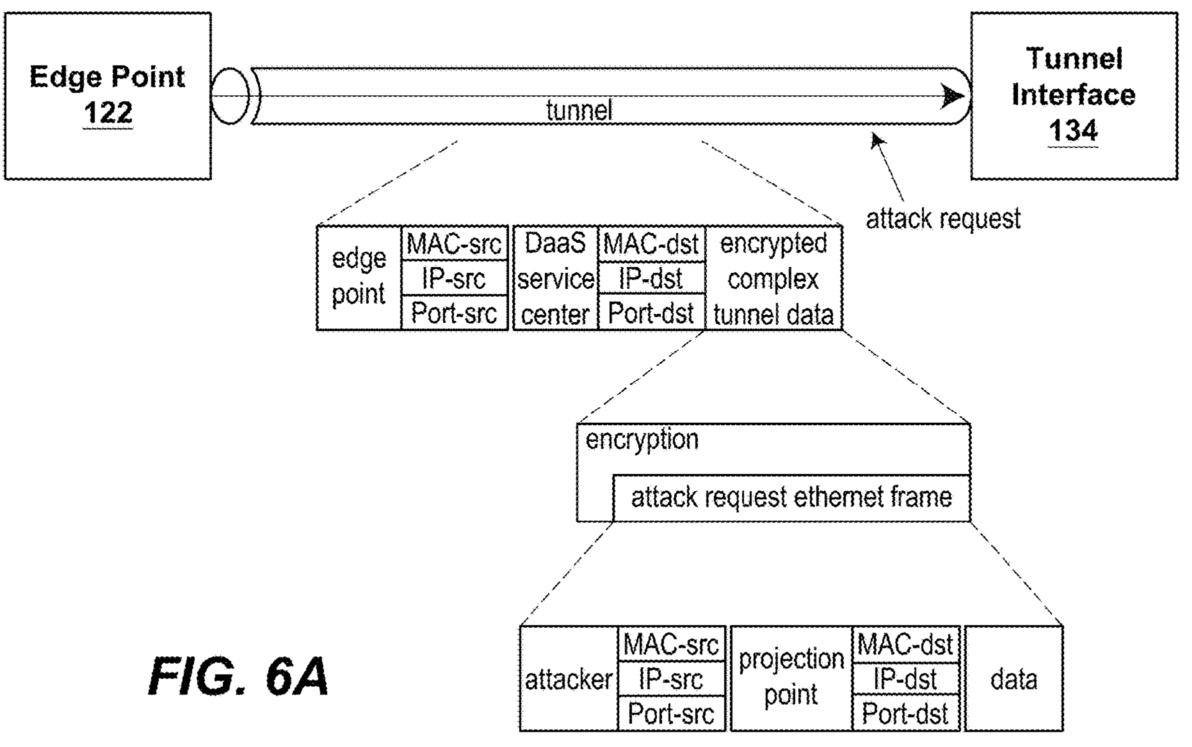
FIG. 6A is a high-level block diagram illustrating encapsulation layers of a request packet for secure tunneling and FIG. 6B illustrates encapsulation layers a response packet, according to an embodiment.

The incoming packet processor 320 receives, in real-time, request packets over the first secure tunnel from a first edge point that has encapsulated the request packets. The encapsulated request packets have a source address of the malicious attacker and a destination address of the first projected decoy and have been encapsulated by the first edge point to have a source address of a first edge point. The incoming packet processor 320, in an embodiment, decapsulates the request packets to expose the destination address of the first projected decoy. An example of request packet encapsulation and decapsulation layers is shown in FIG. 6A.

The routing module 330 uses the destination address route the request packets based on the destination address of the first projected decoy and the source address of the first edge point, in one implementation. The request packets can be received by a decoy manager that sets up a virtual machine or container and loads up an instance of the decoy for high-fidelity interactions. The decoys are configured to emulate an actual network asset in order to expose malicious actors.

Figure 6B:
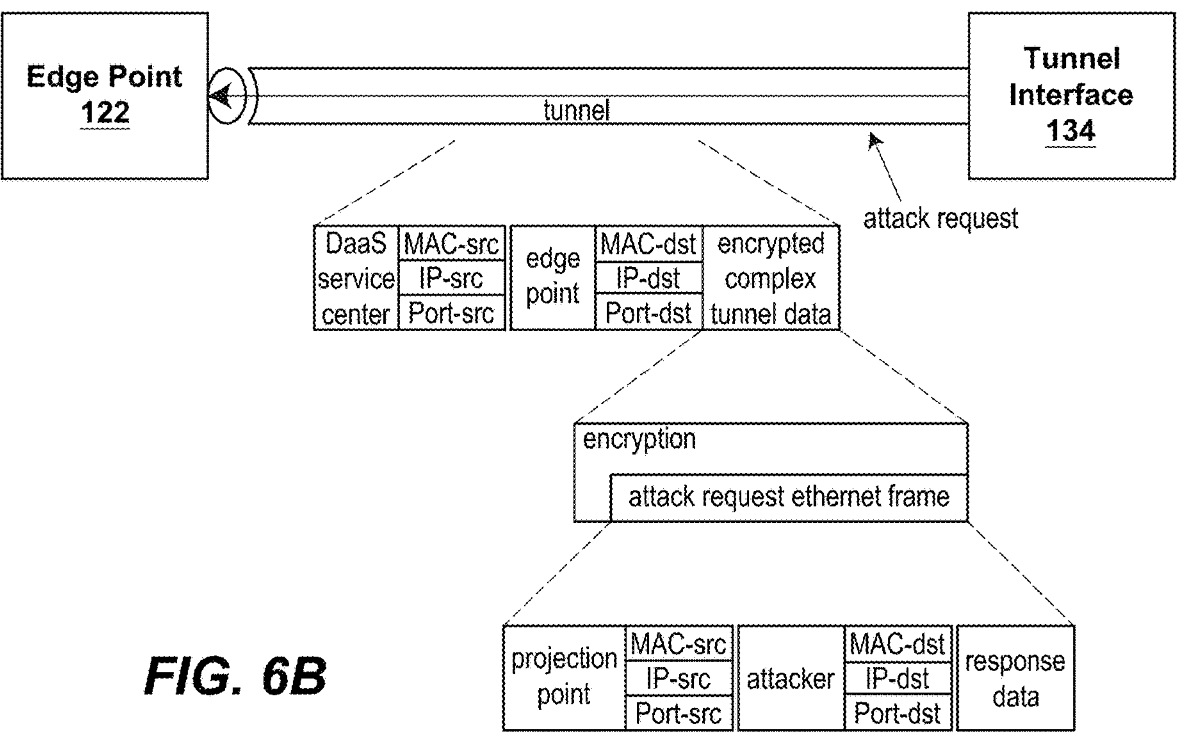

The outgoing packet processor 340 encapsulates response packets generated from high-fidelity processing of the request packets by the first decoy device and routing to the first secure data tunnel. The response packets have a destination address of the malicious attacker and a source address of the first projected decoy and have been encapsulated to have a destination address of the first edge point. An example of response packet encapsulation and decapsulation layers is shown in FIG. 6B. The routing for a response packet can be reverse of a request packet. Alternatively, the routing can be independent of the request packet. A decoy index can provide information needed to route a request packet received from an edge point. The index can include addresses to specific decoy templates or to decoy instances.

The channel module 350 transmits the response packets over the first secure tunnel to the first edge point for decapsulating and forwarding to the malicious actor based on the destination address as exposed.

FIG. 4 is a more detailed block diagram illustrating the edge point 122, according to an embodiment. The tunnel interface includes a VPN module 410 set up a secure tunnel with tunnel interface 134. A decoy projection module 420 handles incoming request packets of an attack from malicious actor 99. Additionally, the decoy projection module 420 can handle outgoing response packets sent back to malicious actor 99.

An incoming packet processor 430 interoperates with tunnel interface 134 tunnel management module 310 for processing packets and encapsulating before transmission. On the flip side, an outgoing packet processor 440 decapsulates processed packets. I/O ports 450 can be Ethernet ports, Wi-Fi ports, or any appropriate technology.

II. Tunneling Methods for Projecting Cloud-Managed Decoys (FIGS. 7-8)

Figure 7:
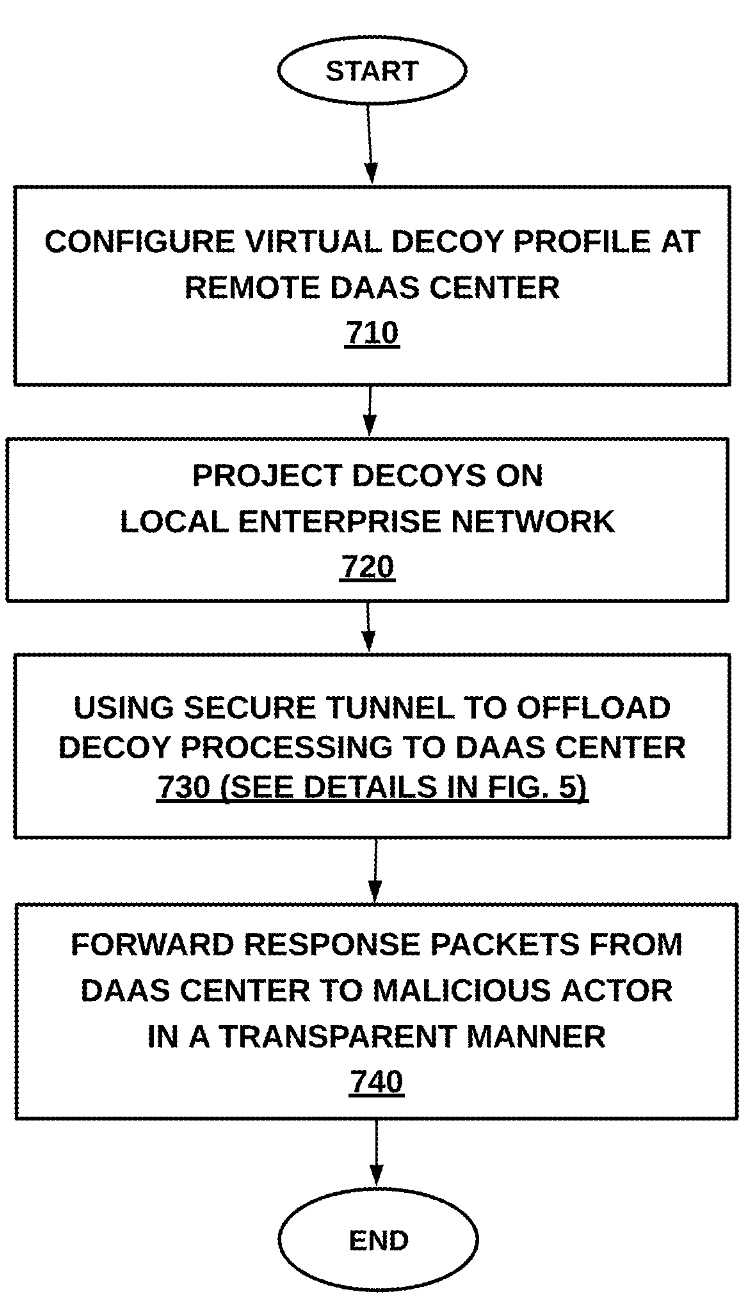
FIG. 7 is a high-level flow diagram of a method for projecting cloud-managed decoys over secure data tunnels to local enterprise networks to interact locally with malicious actors, according to an embodiment.
Figure 8:
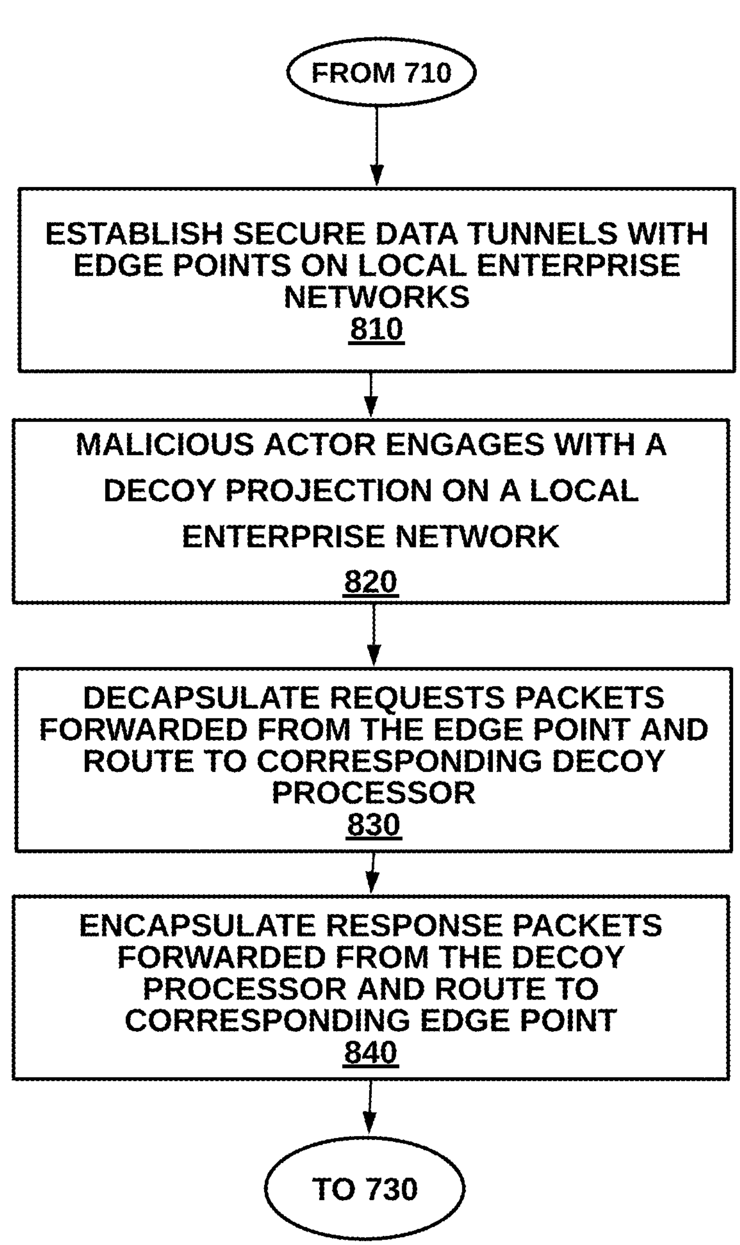
FIG. 8 details a step of using tunnels for offloading decoy processing to the DaaS center, from the method of FIG. 7, according to an embodiment.

FIG. 7 is a high-level flow diagram of a method 400 for projecting cloud-managed decoys over secure data tunnels to local enterprise networks to interact locally with malicious actors, according to an embodiment. The method 700 can be implemented by, for example, system 100 of FIG. 1. The specific grouping of functionalities and order of steps are a mere example as many other variations of method 700 are possible, within the spirit of the present disclosure. Other variations are possible for different implementations.

At step 710, a virtual decoy profile is configured at a remote DaaS center for physical assets on a local enterprise network. Decoy device information is sent over secure data tunnels to edge points for projection from the DaaS center onto local enterprise networks. The edge point runs daemons or agents and shares APIs and data with the Daas center to reconstruct decoys for appearing as if they are processing and responding to requests locally. Preferably, the high-fidelity interactions also cloak the decoy responses so that they appear to be from an actual physical asset of the network.

At step 720, an edge point of the local enterprise network detects request packets from a malicious actor and offloads decoy processing to the DaaS center via secure tunneling. One example of step 720 is further detailed below with respect to FIG. 8.

At step 730, the edge point forwards response packets processed by the Daas center back to the malicious actor.

FIG. 8 details step 720 of using tunnels for offloading decoy processing to the Daas center, according to an embodiment. In particular, at step 810 a plurality of secure data tunnels is established with a plurality of edge points on a plurality of local enterprise networks. To do so, a network administrator can log in to set up an account. IP addresses and MAC addresses of various edge points and for devices being protected can be entered. Corresponding decoy devices can be set up to virtualize a protected physical device using a template of parameters to mimic an actual exchange, based on a type of device, an operating system type and version, applications and services provided, and the like. Preferably, the offloading is transparent to malicious actors. Further, the high-fidelity engagement offered by the remote decoy processing can cause malicious actors to expose their own vulnerabilities.

At step 820, a malicious actor interacts with a decoy projection by IP address or MAC address. The edge point encapsulates the request packets for transmission to the DaaS center over the tunnel, without infecting the local network. The initial request packets have a source address of the malicious attacker and a destination address of the first projected decoy and have been encapsulated by the first edge point to have a source address of a first edge point and a destination address of the tunnel interface.

At step 830, decapsulating the request packets to expose the destination address of the first projected decoy and routing the request packets based on the destination address of the first projected decoy and the source address of the first edge point.

At step 840, encapsulating response packets generated from high-fidelity processing of the request packets by the first decoy device and routing to the first secure data tunnel, wherein the response packets have a destination address of the malicious attacker and a source address of the first projected decoy and have been encapsulated to have a destination address of the first edge point.

At step 850, transmitting the response packets over the first secure tunnel to the first edge point for decapsulating and forwarding to the malicious actor based on the destination address as exposed.

III. Computing Device for Projecting Cloud-Managed Decoys (FIG. 9)

FIG. 9 is a block diagram illustrating a computing device 900 for use in the system 100 of FIG. 1, according to one embodiment. The computing device 900 is a non-limiting example device for implementing each of the components of the system 100, including ATM device 110, network gateway 120, and bank server 130. Additionally, the computing device 900 is merely an example implementation itself, since the system 100 can also be fully or partially implemented with laptop computers, tablet computers, smart cell phones, Internet access applications, and the like.

The computing device 900, of the present embodiment, includes a memory 910, a processor 920, a hard drive 930, and an I/O port 940. Each of the components is coupled for electronic communication via a bus 950. Communication can be digital and/or analog, and use any suitable protocol.

The memory 910 further comprises network access applications 912 and an operating system 914. Network access applications can include 912 a web browser, a mobile access application, an access application that uses networking, a remote access application executing locally, a network protocol access application, a network management access application, a network routing access applications, or the like.

The operating system 914 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 920 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 920 can be single core, multiple core, or include more than one processing elements. The processor 920 can be disposed on silicon or any other suitable material. The processor 920 can receive and execute instructions and data stored in the memory 910 or the hard drive 930.

The storage device 930 can be any non-volatile type of storage such as a magnetic disc, EEPROM, Flash, or the like. The storage device 930 stores code and data for access applications.

The I/O port 940 further comprises a user interface 942 and a network interface 944. The user interface 942 can output to a display device and receive input from, for example, a keyboard. The network interface 944 connects to a medium such as Ethernet or Wi-Fi for data input and output. In one embodiment, the network interface 944 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL and FORTIPHISH families of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a cloud-based deception tunnel interface of a deception as a service (DaaS) center, for managing a plurality of secure data tunnels projecting a plurality of cloud-managed decoys from a plurality of local enterprise networks to interact locally with malicious actors, the method comprising:

establishing a plurality of secure data tunnels with a plurality of edge points on a plurality of local enterprise networks, wherein a first decoy device is sent over a first secure data tunnel to a first edge point for projection from the DaaS onto a first local enterprise network;

receiving in real-time request packets over the first secure tunnel from a first edge point that has encapsulated the request packets, wherein the encapsulated request packets have a source address of the malicious attacker and a destination address of the first projected decoy and have been encapsulated by the first edge point to have a source address of a first edge point;

decapsulating the request packets to expose the destination address of the first projected decoy and routing the request packets based on the destination address of the first projected decoy and the source address of the first edge point;

encapsulating response packets generated from high-fidelity processing of the request packets by the first decoy device and routing to the first secure data tunnel, wherein the response packets have a destination address of the malicious attacker and a source address of the first projected decoy and have been encapsulated to have a destination address of the first edge point; and transmitting the response packets over the first secure tunnel to the first edge point for decapsulating and forwarding to the malicious actor based on the destination address as exposed.

2. The method of claim 1, further comprising:

periodically sending a heartbeat data packet over the first secure data tunnel to maintain the connection when there is no malicious traffic being sent.

3. The method of claim 1, wherein the physical device on the first remote network comprises an operational technology (OT) device.

4. The method of claim 1, wherein the physical device on the first remote network comprises an Internet of Things (IoT) device.

5. The method of claim 1, wherein the physical device on the first remote network comprises an information technology (IT) device.

6. The method of claim 1, wherein the first decoy network is configured by a network administrator remotely connected to the DaaS center through an interface.

7. The method of claim 1, wherein the first secure tunnel and the DaaS center are transparent to the malicious actor.

8. The method of claim 1, wherein the processing of real-time malicious traffic of request packets received from the malicious actor over the first secure data tunnel using the first decoy network comprises high-fidelity operating system interactions.

9. The method of claim 1, wherein the processing of real-time malicious traffic of request packets received from the malicious actor over the first secure data tunnel using the first decoy network comprises routing the malicious traffic request packets from the first secure data tunnel to the first decoy network, and routing the response packets from the first decoy network to the first secure data tunnel.

10. A non-transitory computer-readable medium in a cloud-based deception tunnel interface of a deception as a service (DaaS) center, storing code that when executed, performing a method for managing a plurality of secure data tunnels projecting a plurality of cloud-managed decoys to a plurality of local enterprise networks to interact locally with malicious actors, the method comprising:

establishing a plurality of secure data tunnels with a plurality of edge points on a plurality of local enterprise networks, wherein a first decoy device is sent over a first secure data tunnel to a first edge point for projection from the DaaS onto a first local enterprise network;

receiving in real-time request packets over the first secure tunnel from a first edge point that has encapsulated the request packets, wherein the encapsulated request packets have a source address of the malicious attacker and a destination address of the first projected decoy and have been encapsulated by the first edge point to have a source address of a first edge point;

decapsulating the request packets to expose the destination address of the first projected decoy and routing the request packets based on the destination address of the first projected decoy and the source address of the first edge point;

encapsulating response packets generated from high-fidelity processing of the request packets by the first decoy device and routing to the first secure data tunnel, wherein the response packets have a destination address of the malicious attacker and a source address of the first projected decoy and have been encapsulated to have a destination address of the first edge point; and transmitting the response packets over the first secure tunnel to the first edge point for decapsulating and forwarding to the malicious actor based on the destination address as exposed.

11. A cloud-based deception tunnel interface of a deception as a service (DaaS) center, for managing a plurality of secure data tunnels projecting a plurality of cloud-managed decoys to a plurality of local enterprise networks to interact locally with malicious actors, the deception tunnel interface comprising:

a processor;

a network interface communicatively coupled to the processor and to a data communication network; and a memory, communicatively coupled to the processor and storing:

a tunnel manager to establish a plurality of secure data tunnels with a plurality of edge points on a plurality of local enterprise networks, wherein a first decoy device is sent over a first secure data tunnel to a first edge point for projection from the DaaS onto a first local enterprise network;

a tunnel queue to receive in real-time request packets over the first secure tunnel from a first edge point that has encapsulated the request packets, wherein the encapsulated request packets have a source address of the malicious attacker and a destination address of the first projected decoy and have been encapsulated by the first edge point to have a source address of a first edge point;

an incoming packet processor to decapsulate the request packets to expose the destination address of the first projected decoy and routing the request packets based on the destination address of the first projected decoy and the source address of the first edge point; and an outgoing packet processor to encapsulate response packets generated from high-fidelity processing of the request packets by the first decoy device and routing to the first secure data tunnel, wherein the response packets have a destination address of the malicious attacker and a source address of the first projected decoy and have been encapsulated to have a destination address of the first edge point, wherein the network interface transmits the response packets over the first secure tunnel to the first edge point for decapsulating and forwarding to the malicious actor based on the destination address as exposed.

* * * * *